(12) United States Patent
Gruber et al.

(10) Patent No.: US 9,200,588 B2
(45) Date of Patent: Dec. 1, 2015

(54) METHOD FOR MONITORING THE SIGNAL VALUE OF A VACUUM SENSOR

(75) Inventors: Steffen Gruber, Kleinostheim (DE); Thomas Peichl, Wöllstadt (DE); Scott F. Ross, Oberursel (DE); Thorsten Ullrich, Gernsheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 283 days.

(21) Appl. No.: 13/980,923

(22) PCT Filed: Jan. 18, 2012

(86) PCT No.: PCT/EP2012/050670
§ 371 (c)(1),
(2), (4) Date: Jul. 22, 2013

(87) PCT Pub. No.: WO2012/101012
PCT Pub. Date: Aug. 2, 2012

(65) Prior Publication Data
US 2013/0297179 A1    Nov. 7, 2013

(30) Foreign Application Priority Data

Jan. 24, 2011  (DE) .......... 10 2011 003 055
Dec. 19, 2011  (DE) .......... 10 2011 088 938

(51) Int. Cl.
*G01M 17/007*    (2006.01)
*F02D 45/00*    (2006.01)
*B60T 13/68*    (2006.01)
*B60T 17/22*    (2006.01)
*G01L 27/00*    (2006.01)

(52) U.S. Cl.
CPC .......... *F02D 45/00* (2013.01); *B60T 13/68* (2013.01); *B60T 17/22* (2013.01); *G01L 27/007* (2013.01)

(58) Field of Classification Search
CPC .................... G01M 17/007; B60T 17/22
USPC .................... 73/121, 128, 129
See application file for complete search history.

(56) References Cited

U.S. PATENT DOCUMENTS

| 6,062,656 A | 5/2000 | Unterforsthuber et al. |
| 6,557,403 B1 * | 5/2003 | Kerns .............. 73/121 |

(Continued)

FOREIGN PATENT DOCUMENTS

| DE | 1 916 595 | 4/1969 |
| DE | 197 43 959 | 4/1999 |

(Continued)

OTHER PUBLICATIONS

International Search Report corresponding PCT/EP20102/050670, dated Sep. 6, 2012.
German Search Report corresponding to DE 10 2011 088 938.8, dated Feb. 20, 2012.

*Primary Examiner* — Eric S McCall
(74) *Attorney, Agent, or Firm* — RatnerPrestia

(57) ABSTRACT

A method for monitoring the signal value of a vacuum sensor of a vacuum system in a vehicle, wherein a vacuum generator and a brake booster are provided in the vacuum system, an upper error threshold (−p_vac_errorthreshold) is calculated as a function of the operating states of the vacuum generator and of the brake booster, and wherein an error is identified when the signal value of the vacuum sensor exceeds the current value of the error threshold.

19 Claims, 2 Drawing Sheets

(56) References Cited

U.S. PATENT DOCUMENTS

| | | |
|---|---|---|
| 7,076,347 B2 | 7/2006 | Lehner et al. |
| 7,878,053 B2 * | 2/2011 | Lehner et al. .................. 73/121 |
| 8,978,456 B2 * | 3/2015 | Pursifull et al. .............. 73/121 |
| 2001/0035166 A1 * | 11/2001 | Kerns et al. .................. 123/494 |
| 2005/0218716 A1 * | 10/2005 | Collins et al. ............ 303/115.3 |
| 2006/0288766 A1 | 12/2006 | Wang et al. |
| 2009/0071147 A1 | 3/2009 | Wang et al. |
| 2010/0222980 A1 | 9/2010 | Berr |
| 2010/0295362 A1 * | 11/2010 | Romero et al. .................. 303/3 |

FOREIGN PATENT DOCUMENTS

| | | |
|---|---|---|
| DE | 199 35 899 | 2/2001 |
| DE | 100 52 257 | 5/2002 |
| DE | 10 2004 060 220 | 8/2005 |
| DE | 10 2008 047 379 | 4/2009 |
| DE | 10 2009 011 280 | 9/2010 |
| GB | 1 298 396 | 11/1972 |
| WO | WO 03/013922 | 2/2003 |
| WO | WO 2007/082932 | 7/2007 |

* cited by examiner

METHOD FOR MONITORING THE SIGNAL VALUE OF A VACUUM SENSOR

CROSS REFERENCE TO RELATED APPLICATIONS

This application is the U.S. National Phase Application of PCT International Application No. PCT/EP2012/050670, filed Jan. 18, 2012, which claims priority to German Patent Application No. 10 2011 003 055.7, filed Jan. 24, 2011, and German Patent Application No. 10 2011 088 938.8, filed Dec. 19, 2011, the contents of such applications being incorporated by reference herein.

FIELD OF THE INVENTION

The invention relates to a method for continuously monitoring the signal value of a vacuum sensor. The vacuum sensor is provided in a vacuum system of a vehicle. Such a vacuum system can be used, for example, to supply a brake booster. The vacuum in the vacuum system is generated by means of a vacuum generator (or a plurality thereof).

BACKGROUND OF THE INVENTION

Brake systems according to the prior art use a vacuum brake booster, i.e. they use vacuum as an auxiliary energy. Generally the vacuum produced in the intake pipe in an internal combustion engine or a mechanical vacuum pump coupled to an internal combustion engine serves as a vacuum generator. In particular in vehicles with an electric drive (electric vehicles or hybrid vehicles) electric vacuum pumps are also used.

From time to time, in modern vehicle designs (down sizing) the necessary minimum braking effect is no longer achieved when the vacuum supply or the vacuum brake booster fails, with the result that in this case a hydraulic brake boosting assistance function, which is implemented by means of the ESC (Electronic Stability Control) system, has to be activated. Such a brake boosting assistance function according to the prior art uses the signal of a vacuum sensor for this purpose.

In order to ensure the availability of the hydraulic assistance function and respectively generate a driver warning in the event of non-availability, it is necessary to monitor the vacuum sensor signal. Known methods for this are:
 a) to use a redundant vacuum sensor,
 b) to process a further vacuum signal, for example from the engine controller.

SUMMARY OF THE INVENTION

An aspect of the invention is a method of the type mentioned at the beginning which requires as little structural expenditure as possible, in particular without using a redundant vacuum measurement.

According to an aspect of the invention, the operating states of the vacuum generator and of the brake booster are monitored. This usually does not result in any additional structural expenditure since said operating states have to be monitored in any case for the ESC (Electronic Stability Control) system.

An upper error threshold (−p_vac_errorthreshold) is calculated as a function of the detected operating states of the vacuum generator and of the brake booster which signals a vacuum value which cannot be exceeded by the vacuum system in the given operating situation under the given operating conditions and taking into account the structural properties thereof. If the signal of the vacuum sensor nevertheless signals a higher vacuum value than the current value of the error threshold, either a measuring error must have occurred or the vacuum sensor must in fact be faulty. For this reason, an error is detected in this case.

The relative pressure with respect to the ambient air pressure is referred to as the vacuum here. The vacuum in the vacuum system is lower (during operation of the system) than the ambient air pressure.

The vacuum generator is preferably an intake duct of an internal combustion engine and/or a vacuum pump.

The method according to an aspect of the invention makes use of the fact that in modern vehicle architectures there are operating states in which the vacuum generator is switched off. This is the case, for example, in vehicles with an engine stop/start function and in vehicles with an electric vacuum pump.

The method is based on the calculation of an upper error threshold on the basis of a simplified physical model of the vacuum system (vacuum generator and brake booster).

According to a further refinement of the invention, a driver warning signal is preferably output, for example by actuating a warning lamp, when the vacuum value of the vacuum sensor signal exceeds the current calculated value of the upper error threshold.

According to a further refinement of the invention, when the vacuum generator is active and the brake booster is not activated, a value of the error threshold (−p_vac_errorthreshold) which increases with a defined gradient (p_grad_evac) is calculated on the basis of a starting value, wherein the starting value
  is a high negative value at the system start,
  and otherwise is the value of the error threshold respectively calculated last.

According to a further refinement of the invention, the method parameter p_grad_evac assumes different values depending on the type of respectively activated vacuum generator (different gradients of the evacuation when the internal combustion engine is active/the vacuum pump is active or when the two are superimposed on one another).

According to one advantageous further refinement of the invention, the increase in the error threshold is limited to a predefinable maximum value, wherein this limiting value is to be defined on the basis of the maximum achievable vacuum of the vacuum generator which is used, for example 900 mbar at sea level.

According to a further refinement of the invention, the maximum value can preferably assume different values depending on the type of the respectively activated vacuum source (different vacuum level in the case of evacuation by means of an internal combustion engine/vacuum pump or when the two are superimposed on one another).

When a vacuum source is inactive and the brake booster is not activated, according to one advantageous refinement the calculated value of the error threshold is preferably kept constant.

When the vacuum source is inactive and the brake booster is activated, according to one advantageous refinement of the invention the error threshold can additionally be reduced by a predefinable difference value.

According to a further advantageous refinement of the invention, the absolute value of the predefinable difference value is preferably calculated as a function of the hydraulic brake pressure which occurs owing to activation of the brakes.

According to a further advantageous refinement of the invention, the calculation of the predefinable difference value can be carried out as a function of the hydraulic brake pressure taking into account the volume capacity characteristic of the brake system.

The maximum value of the hydraulic brake pressure which is achieved within an activation of the brakes can preferably be used to calculate the predefinable difference value.

Furthermore, the accumulated value of the hydraulic brake pressure can preferably be used to calculate the predefinable difference value during an activation of the brakes.

The hydraulic brake pressure p_tmc is preferably detected by means of a pressure sensor in the ESC system.

Alternatively, according to a further advantageous refinement of the invention the travel distance of the diaphragm in the vacuum brake booster can also be used to calculate the predefinable difference value.

Another advantageous refinement of the invention provides that the maximum value of the travel distance of the diaphragm in the brake booster which is achieved within an activation of the brakes is used to calculate the predefinable difference value.

In addition, the accumulated value of the travel distance of the diaphragm in the brake booster within an activation of the brakes can also be used to calculate the predefinable difference value.

The travel distance of the diaphragm in the vacuum brake booster is advantageously detected by means of a diaphragm travel sensor in the brake booster or by means of a deflection sensor (distance or angle) on the brake pedal or by means of a travel sensor in or on the master brake cylinder.

BRIEF DESCRIPTION OF THE DRAWINGS

An exemplary embodiment of the invention will be explained in more detail below with reference to the drawing, in which.

DETAILED DESCRIPTION OF THE PREFERRED EMBODIMENTS

Figure 1:
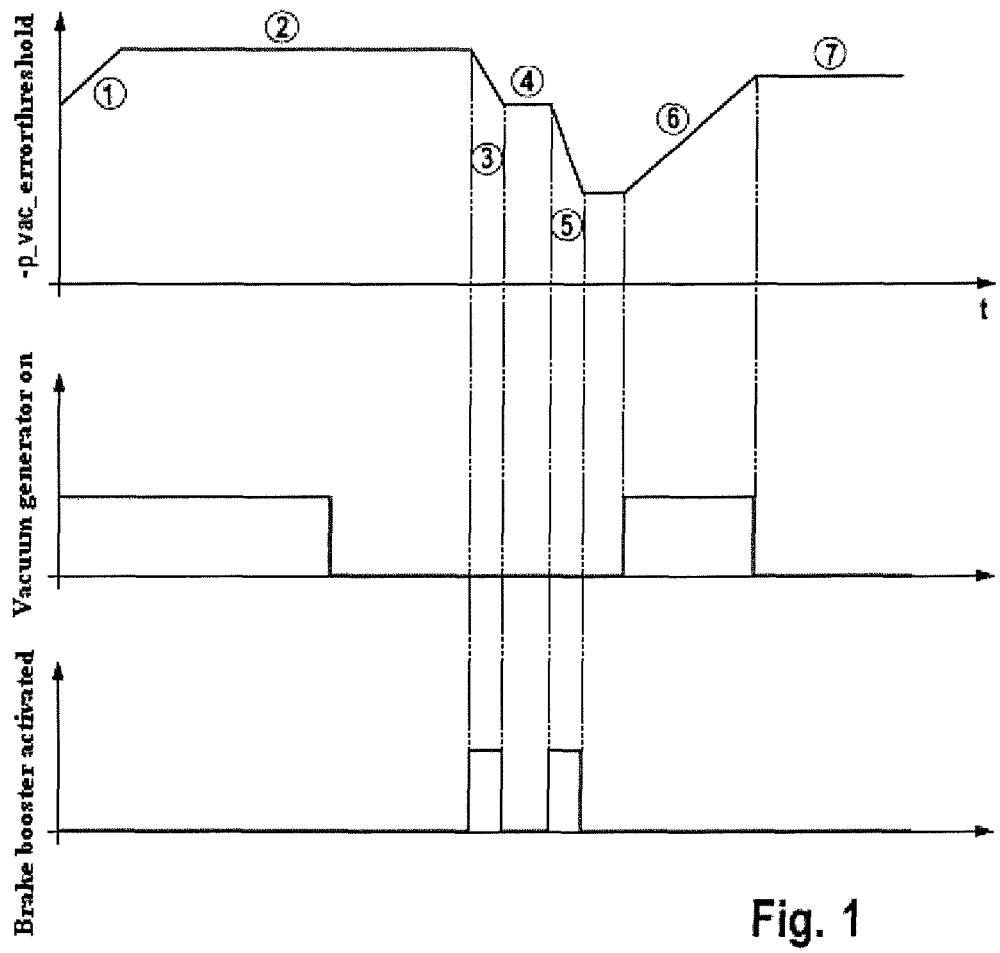
FIG. 1 shows an exemplary time profile of the error threshold which is determined according to the invention.

FIG. 1 shows by way of example a time profile of the values of the error threshold such as can be determined by means of the method according to the invention.

The time periods at which the brake booster of a vehicle (and therefore also the brake pedal thereof) is activated is symbolized at the bottom of the time diagram in FIG. 1.

The brake booster itself is supplied by a vacuum source via a vacuum system (both not illustrated), the active time periods of which vacuum source are entered in the vertical center in the time diagram. The vacuum source (which is not illustrated in the figure) can be, for example, an intake duct of an internal combustion engine or a separate pump.

According to the invention, an upper error threshold (-p_vac_errorthreshold) is calculated as a function of the operating states of the vacuum generator and of the brake booster.

Said error threshold (-p_vac_errorthreshold) is entered as the top profile in the time diagram in FIG. 1.

An error is identified when the vacuum signal value of the vacuum sensor exceeds the current value of the error threshold, that is to say when the measured vacuum is higher than the theoretically achievable vacuum which is signaled by the error threshold. This indicates that a vacuum sensor which is provided in the vehicle signals a vacuum value in the vacuum system which is implausible, since it would not be achievable under the given structural conditions and operating states.

The time profile of the values of the error threshold is illustrated in FIG. 1 in seven phases which are explained in more detail below.

When the vacuum generator is active and the brake booster is not activated (phase 1), a value of the error threshold (method parameter p_vac_errorthreshold) which increases with a defined gradient (p_grad_evac) is calculated on the basis of a starting value, wherein the starting value is a high negative value at the system start (see phase 1 in FIG. 1).

If this value (start of phase 2), which is a maximum value (method parameter p_vac_max) which is predefinable, is reached, the value of the error threshold is not increased further, as is also apparent in the further profile of the phase 2 in FIG. 1 in which the profile of the values of the error threshold no longer rise further when a maximum value is reached.

The maximum value can advantageously be predefined on the basis of the maximum achievable vacuum of the vacuum source used, for example 900 mbar at sea level.

In the further profile of phase 2, the vacuum generator becomes inactive.

During a subsequent phase 3, the brake booster is activated and the profile of the values of the error threshold in phase 3 drops. In this phase, the values of the error threshold are advantageously continuously reduced by a predefinable difference value (delta_p_vac).

In phase 4, neither the brake booster nor the vacuum generator are active. The values of the error threshold are therefore kept constant.

In the following phase 5, basically the same operating situation is present as in phase 3; the brake booster is activated and the vacuum generator is inactive. The error threshold in phase 5 therefore also assumes a falling profile.

After a brief phase without further events (comparable to phase 4), a phase 6 follows in which the brake booster is inactive but the vacuum generator is activated. In this phase, the values of the error threshold increase again, advantageously in turn with a predefinable gradient.

At the subsequent start (only indicated) of the following phase 7, the values of the error threshold are kept constant since neither the brake booster nor the vacuum generator are active.

From FIG. 1 it becomes clear that the time profile of the error threshold determined by means of the method according to the invention represents a type of maximum value of the possible vacuum in the vacuum system of the vehicle. If a vacuum sensor signals a higher vacuum than that specified by the error threshold, an error is identified since this signaled vacuum is implausible.

Figure 2:
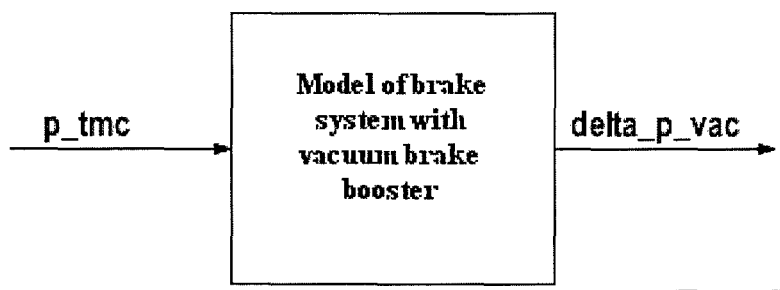
FIG. 2 shows a symbolic representation of the determination of the difference value (delta_p_vac) as a function of the hydraulic brake pressure.

The difference value delta_p_vac is preferably calculated as a function of the hydraulic brake pressure p_tmc which occurs owing to the activation of the brakes (see FIG. 2). For this purpose, a model of the brake system, in particular of the volume characteristics and of the changes therein, is used, for example in the brake booster.

Figure 3:
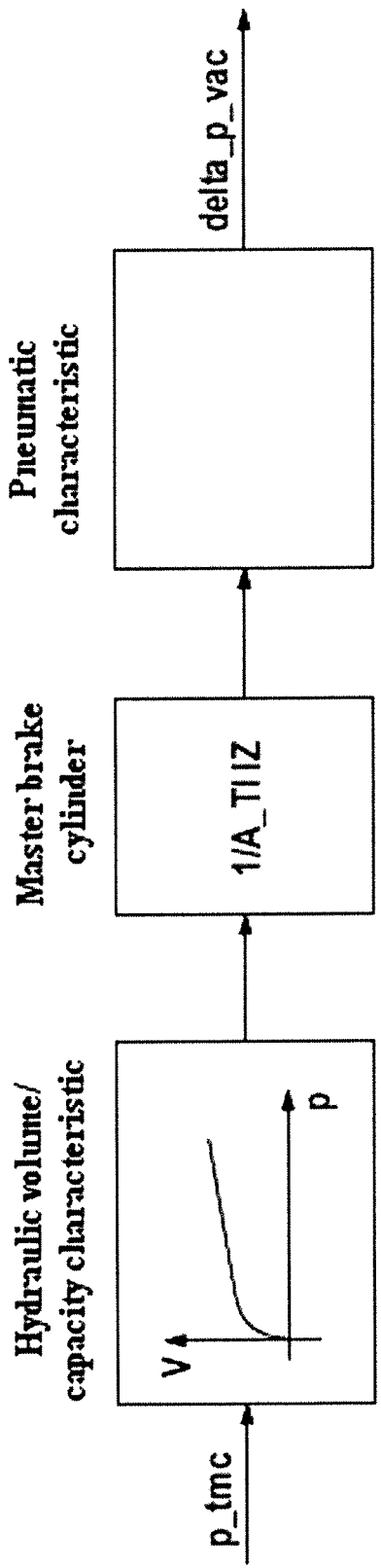
FIG. 3 shows an illustration corresponding to FIG. 2 with the volume capacity characteristic of the brake system being additionally taken into account.

This is indicated in more detail in FIG. 3. The difference value delta_p_vac is advantageously calculated as a function of the hydraulic brake pressure p_tmc and taking into account the volume capacity characteristic of the brake system, the size of the master brake cylinder and taking into account the pneumatic characteristic of the brake system.

The invention claimed is:

1. A method for monitoring a signal value of a vacuum sensor of a vacuum system in a vehicle, wherein
a vacuum generator and a brake booster are provided in the vacuum system,
an upper error threshold (−p_vac_errorthreshold) is calculated as a function of the operating states of the vacuum generator and of the brake booster, wherein
an error is identified when the signal value of the vacuum sensor exceeds a current value of the error threshold, wherein
when the vacuum generator is active and the brake booster is not activated, a value of the error threshold (p_vac_errorthreshold) which increases with a predefinable gradient (p_grad_evac) is calculated on the basis of a starting value, and wherein the starting value is a high negative value at the system start, and otherwise is the value of the error threshold respectively calculated last.

2. The method as claimed in claim 1, wherein the vacuum generator is an intake duct of an internal combustion engine and/or a vacuum pump.

3. The method as claimed in claim 1, wherein a driver warning signal is output, by a warning lamp, when the value of the vacuum sensor signal exceeds the value of the calculated upper error threshold (−p_vac_errorthreshold).

4. The method as claimed in claim 1, wherein the gradient (p_grad_evac) has a variable value as a function of a number, design and performance of the activated vacuum generator or generators.

5. The method as claimed in claim 1, wherein when the vacuum generator is inactive and the brake booster is not activated, the value of the error threshold is kept constant.

6. The method as claimed in claim 1, wherein the value of the error threshold is limited to a predefinable maximum value (p_vac_max), wherein this limiting value is selected on the basis of a maximum achievable vacuum of the vacuum generator which is used.

7. The method as claimed in claim 6, wherein a maximum value of the error threshold (p_vac_max) has a variable value as a function of a number, design and performance of the activated vacuum generator or generators.

8. A method for monitoring a signal value of a vacuum sensor of a vacuum system in a vehicle, wherein
a vacuum generator and a brake booster are provided in the vacuum system,
an upper error threshold (−p_vac_errorthreshold) is calculated as a function of the operating states of the vacuum generator and of the brake booster, wherein
an error is identified when the signal value of the vacuum sensor exceeds a current value of the error threshold,
wherein when the vacuum generator is inactive and the brake booster is not activated, the value of the error threshold is reduced by a predefinable difference value (delta_p_vac).

9. The method as claimed in claim 8, wherein the calculation of the difference value (delta_p_vac) is carried out as a function of the hydraulic brake pressure (p_tmc) taking into account a volume capacity characteristic of a brake system of the vehicle.

10. The method as claimed in claim 8, wherein a maximum value of the hydraulic brake pressure (p_tmc) which is achieved during an activation of the brakes is used to calculate the difference value (delta_p_vac).

11. The method as claimed in claim 8, wherein an accumulated value of the hydraulic brake pressure (p_tmc) in an activation of the brakes is used to calculate the difference value (delta_p_vac).

12. The method as claimed in claim 8, wherein the difference value (delta_p_vac) is calculated as a function of a hydraulic brake pressure (p_tmc) which occurs owing to activation of the brakes.

13. The method as claimed in claim 12, wherein the hydraulic brake pressure (p_tmc) is detected by a pressure sensor in an ESC (electronic stability control) system of the vehicle.

14. The method as claimed in claim 12, wherein a travel distance of a diaphragm in the vacuum brake booster is used to calculate the difference value (delta_p_vac).

15. The method as claimed in claim 14, wherein a maximum value of the travel distance of the diaphragm in the brake booster which is achieved during an activation of the brakes is used to calculate the difference value (delta_p_vac).

16. The method as claimed in claim 14, wherein an accumulated value of the travel distance of the diaphragm in the brake booster within an activation of the brakes, which is achieved during an activation of the brakes, is used to calculate the difference value (delta_p_vac).

17. The method as claimed in claim 14, wherein the travel distance of the diaphragm in the vacuum brake booster is detected by means of a diaphragm travel sensor in the brake booster.

18. The method as claimed in claim 14, wherein the travel distance of the diaphragm in the vacuum brake booster is detected by means of a deflection sensor (distance or angle) on a brake pedal of the vehicle.

19. The method as claimed in claim 14, wherein the travel distance of the diaphragm in the vacuum brake booster is detected by means of a travel sensor in or on a master brake cylinder of the vehicle.

* * * * *